United States Patent [19]

Kietzman

[11] Patent Number: 4,548,650

[45] Date of Patent: Oct. 22, 1985

[54] DIATOMITE-MODIFIED ASPHALT MEMBRANES AND SLURRY SEALS

[75] Inventor: John H. Kietzman, Golden, Colo.

[73] Assignee: Manville Service Corporation, Denver, Colo.

[21] Appl. No.: 522,871

[22] Filed: Aug. 12, 1983

Related U.S. Application Data

[63] Continuation-in-part of Ser. No. 457,984, Jan. 14, 1983, which is a continuation-in-part of Ser. No. 343,075, Jan. 27, 1982.

[51] Int. Cl.$^4$ .............................................. C08L 95/00
[52] U.S. Cl. ............................. 106/281 R; 106/280; 427/138
[58] Field of Search ........................ 106/281 R, 280; 427/138

[56] References Cited

U.S. PATENT DOCUMENTS 3,870,426  3/1975  Kietzman et al. ..................... 404/82

OTHER PUBLICATIONS

Skidmore, H. W., and J. Donohue; "Special Sheet Asphalt Floors in Industrial Plant at Kohler, Wis.", reprinted from *Engineering and Contracting*; Mar. 1928.
Kallas, B. F., and V. P. Puzinauskas; "A Study of Mineral Fillers in Asphalt Paving Mixtures"; *Proceedings of Association of Asphalt Paving Technology*; vol. 30, pp. 493-528; 1961.

*Primary Examiner*—Paul Lieberman
*Assistant Examiner*—Amelia B. Yarbrough
*Attorney, Agent, or Firm*—John D. Lister; Cornelius P. Quinn; Richard K. Thomson

[57] ABSTRACT

Diatomite-modified membrane and slurry seal mixes having improved properties. An impermeable membrane suitable for protecting cement bridge decks and roadways has from 9 to 14% by weight asphalt, 0.5 to 3.0% diatomite with a preferred diatomite/asphalt ratio in the range of 0.08 to 0.30, with the balance being fine aggregate (sand). This membrane can be placed by conventional paving equipment, can withstand temporary traffic loading prior to installation of a wearing course, can be preformulated in sheets, and is a crack resistant (i.e., self-healing) under normal traffic loads. Also disclosed is a slurry seal cold mix with improved abrasion resistance, adhesion/cohesion, and tensile strength. With these improved characteristics, slurry seals can be useful as bridge deck and roadway membranes in addition to its standard overlay uses.

6 Claims, 7 Drawing Figures

DIATOMITE-MODIFIED ASPHALT MEMBRANES AND SLURRY SEALS

This application is a continuation-in-part of U.S. patent application Ser. No. 06/457,984, filed Jan. 14, 1983 which is in turn a continuation-in-part of Ser. No. 06/343,075, filed Jan. 27, 1982, which applications are hereby incorporated by reference.

BACKGROUND AND SUMMARY OF THE INVENTION

In the late 1960's and early 1970's, an improved water-impermeable membrane was developed to protect concrete bridge decks and roadways from attack by road salts and freeze-thaw cycling degradation. This improved membrane formed the subject matter claimed in U.S. Pat. No. 3,870,426 issued Mar. 11, 1975, which is incorporated herein by reference. That membrane could be applied by conventional road paving equipment without the need for special surface preparation, was capable of healing its own cracks and could tolerate temporary traffic until a wearing course could be laid thereover. However, that membrane contained asbestos fibers which are known, in certain quantities and fiber sizes, to pose significant health hazards, particularly to smokers. Because the addition of the asbestos fibers to the mix was generally performed on-site outside its control, the Assignee dedicated the remaining life of the patent, so as not to have to license such technology or sell fiber for such usage, and has sought a membrane formulation with equivalent or better characteristics without the associated health hazards.

The asbestos membrane required asphalt concentrations of 14–18% (40 to 50% above normal) or higher to assure sufficient compactability and crack resistance, asbestos fiber asphalt ratios above 0.30 preferably from 0.35 to 0.45 for stability, and overall fiber quantities between 5 and 7%. For that membrane mix, stability, as measured by plastic flow, was virtually independent of asphalt content, being primarily a function of cohesiveness of the mix which was largely dependent on fiber content (hence, the minimum fiber/asphalt ratio).

Initial success at stabilizing high asphalt-containing pavements as in Ser. No. 343,075 ('075) above, suggested that diatomite might prove suitable as a filler in a membrane mix. Field tests of small pavement sheets have shown diatomite to be even more effective in such membrane mixes than was asbestos. Because of its high surface area, microscopic porous structure, and affinity for absorbing asphalt (i.e., effectiveness at resisting flow), diatomite can be used in small quantities (0.5 to 3.0%) in hot mix membranes to achieve stability. In such small amounts, diatomite does not cause the high viscosity which adversely affects compaction and permeability of the membrane mix typical of 5–7% asbestos (or, a like amount of diatomite, for that matter). In fact, small amounts of diatomite function as an extender improving compactability as described and claimed in application Ser. No. 06/457,984 ('984). Accordingly, it is unnecessary to increase asphalt content 50% to the 14–18% by weight range in order to improve compaction and achieve impermeability of the membrane. A much more modest increase of 5 to 35% percent above normal sheet asphalt concentration of 8.5 to 10.5% to the 9 to 14% by weight range is made possible in the diatomite-modified mix.

Field trials indicate that the diatomite-modified membrane mix will have all of the advantages of the asbestos membrane and several others, in addition. This membrane is less expensive than the asbestos membrane, since it uses less asphalt and less filler, and is significantly easier to place. Unlike the asbestos mix, the stability of the diatomite-modified membrane mix is not independent of asphalt content. In addition, diatomite's influence on plastic flow is not limited to increasing cohesiveness but also relates to its effects on interparticle friction. Further, for hot mixes using conventional asphalts (80–110 pen.) and CELITE ®292, there does not appear to be any appreciable benefit to stability obtained by increasing the diatomite/asphalt ratio above 0.16. (Note, placability and/or the use of other diatomites may dictate higher diatomite/asphalt ratios.) Further, the diatomite-modified membrane mix is not as viscous as the asbestos membrane mix and, hence may be placed more easily and quickly using conventional paving equipment. Last, since diatomite disperses so well in asphalt mixes, it makes possible the addition of diatomite to cold mix pavements such as slurry seals. The improvements in cohesive/adhesive strength, tensile strength and mastic abrasion resistance rendered such a cold mix by diatomite, now make diatomite-modified slurry seals more attractive for a variety of uses including as a crack-resistant interlayer in the form of bridge deck and resurfacing underlayment membranes, as well as for economical resurfacing. When used in such cold mixes where elevated temperatures will not be used and, accordingly, the outgassing of water vapor which occurs in the hot mix will not occur in the same manner, pre-wetting of the diatomite is recommended in order to prevent premature absorption of the emulsion by the diatomite.

Additional features, characteristics and advantages of the present invention will become apparent after a reading of the following specification.

DETAILED DESCRIPTION OF THE PREFERRED EMBODIMENTS

Figure 1:
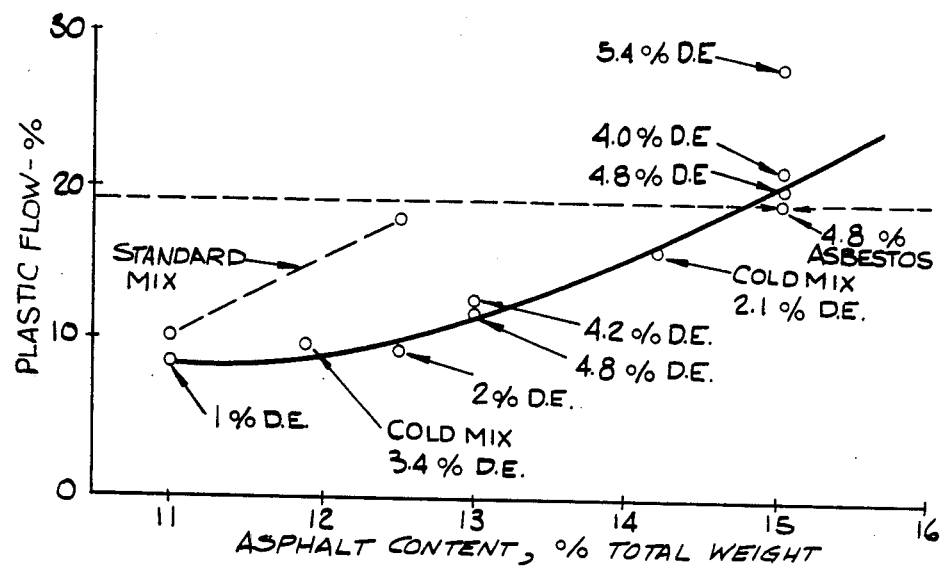
FIG. 1 is a plot of percent plastic flow vs. asphalt content for diatomite-modified membrane mixes tested in the Denison field trials.

Cores taken from four different asphalt pavements placed in Calgary, Alberta (as described more fully in the '984 application) containing 1 and 2% of asbestos fiber and diatomite, respectively, (specifically a grade of diatomite sold by MANVILLE CORPORATION as CELITE ®292) indicated that diatomite, when used in equal amounts, was equivalent to asbestos in providing abrasion resistance and cohesive strength to such paving mixes. Therefore, it was originally believed that diatomite would be equivalent in preventing instability in the form of plastic flow in membrane mixes, as well.

Accordingly, a plurality of test sample sheets of both hot and cold membranes were prepared in the Denver Research and Development Center using Celite®292. These sheets contained primarily sand aggregate (angular crushed granitic screenings) with no large stone component and a variety of different asphalt and diatomite contents to determine what formulations would perform best. Exxon AC-10 grade asphalt was used having a typical initial penetration of 104. In preparing the hot mix sheets, the asphalt was added to and mixed with the aggregate and then the diatomite added to the asphalt-coated aggregate. As discussed in the '075 application, this prevents crushing of the diatoms by the aggregate that would occur were the diatomite to be added to the aggregate using the normal mixing procedure. Cold mix formulation procedures will be discussed more fully hereafter. The fine aggregate had between 70 and 100% passing no. 8 mesh sieve. (Note, in some states, no. 10 mesh is the dividing line between sand and stone.) In order to further accelerate plastic flow, it was decided to place the sheets in a warm climate under concentrated truck traffic. Therefore, the sheets which were 12"×18"×⅜" (thickness varied from ¼ to ⅜") were transported to Denison, Tex. and placed over the existing pavement adjacent the gate area of one of Assignee's plants. The sheets were intentionally positioned in and transverse to the wheel paths of heavily laden trucks at a point where starting and stopping occur. These sheets were placed on a predried tack coat of SS-1-h asphalt emulsion which had been brushed onto the existing pavement surface (standard overlay procedure).

The formulations tested and the results of these tests are shown in Table I. Percent plastic flow was calculated using the original sheet length and the final sheet length after four months (July–October) of traffic and heat. Note, the percent plastic flow should be used for comparison purposes only. These membranes will not ordinarily be exposed to direct traffic flow for any extended period of time. Generally, such a membrane will be sandwiched between the underlying pavement and an asphalt wearing course. The hot wearing course will be laid over the membrane and rolling of the wearing course will heat the asphalt in the membrane and compact the membrane to impermeability. During such use where the membrane is totally confined, plastic flow will be significantly limited.

TABLE I

| Sample | Filler (% wt)* | Asphalt (% wt)* | Filler/Asphalt Ratio | % Increase In Asphalt | % Plastic Flow |
|---|---|---|---|---|---|
| S-1 | 0 | 11.0 | — | 5 | 10.1 |
| S-2 | 0 | 12.5 | — | 19 | 19.1 |
| A | 4.8 7MO6 Asbestos | 15.0 | 0.32 | 43 | 19.1 |
| C-1 | 4.8 | 15.0 | 0.32 | 43 | 19.1 |
| C-2 | 4.0 | 15.0 | 0.27 | 43 | 20.9 |
| C-3 | 5.4 | 15.0 | 0.36 | 43 | 27.5 |
| C-4 | 2.0 | 12.5 | 0.16 | 19 | 9.2 |
| C-5 | 4.2 | 13.0 | 0.32 | 24 | 12.3 |
| C-6 | 1.0 | 11.0 | 0.09 | 5 | 8.5 |
| C-7 | 4.8 | 13.0 | 0.37 | 24 | 11.8 |
| EM 15** | 2.1 | 14.2 | 0.15 | 35 | 15.6 |
| EM 29** | 3.4 | 11.9 | 0.29 | 13 | 9.5 |

| Graduation % Passing | | | | | | |
|---|---|---|---|---|---|---|
| Mix/Size 200*** | 100 | 50 | 30 | 16 | 8 | 4 |
| Hot Mix 9 | 15 | 27 | 42 | 59 | 79 | 100 |
| Cold Mix 11 | 19 | 32 | 50 | 68 | 90 | 100 |

*% wt is expressed as percent weight of total mix.
**For these cold mixes, asphalt percentages are residual asphalt values.
***Numbers represent ASTM sieve sizes; percentages are for aggregate less added filler.

FIG. 1 is a plot of percent plastic flow vs. asphalt content taken from the results given in Table I. As can be seen, with the exception of the C-3 sample, there is a good correlation between plastic flow and asphalt content for all diatomite samples. The asbestos control is plotted as a straight line for comparison and, as was previously mentioned, plastic flow is independent of asphalt content for asbestos membrane mixes. The explanation for the C-3 sample would appear to lie in its high diatomite content. For this high asphalt content mix (43% above normal), 5.4% diatomite is too much which results in (a) a volumetric extension of the already large asphalt content to a level exceeding the diatomite's capacity to control plastic flow, or (b) an excess absorptive capacity of the diatomite subsequently satisfied by water which attacks the cohesive strength of the mix (i.e., water susceptability).

Returning to Table I, it is apparent that the lower asphalt and diatomite level hot mixes (C-4 and C-6) which have diatomite/asphalt ratios of 0.16 and 0.09, respectively) have the greatest resistance to plastic flow. Although resistance to plastic flow is adequate at these low diatomite/asphalt ratios, the mix designer may wish to consider a ratio in the range of 0.15 and 0.30, preferably between 0.23 and 0.29 for placability. While elevated asphalt levels of 40–50% above normal were necessary in the asbestos membrane mixes, in order to overcome the cohesive forces of the asbestos and allow placement, such is not the case with the diatomite membrane mixes. The high asphalt mixes (C-1 through C-3) with increased diatomite contents do not have as good resistance to plastic flow and have no beneficial features to recommend them over the C-4 and C-6 type mixes.

Diatomite, in small amounts, does not have pronounced adverse effects on the stiffness (viscosity) of the mix which would require high asphalt levels to overcome. In fact, small amounts of diatomite can temporarily volumetrically extend the asphalt in hot mixes making the mix behave like a high-asphalt mix without substantial increases in asphalt. Accordingly, asphalt increases of from 5 to 35% above normal membrane asphalt levels of 8.5 to 10.5% by weight to the 9 to 14% range are all that is required to improve compactability and make the membrane impermeable. The added asphalt insures that any reflection cracking of the membrane will be self healing under normal traffic loading compression on the wearing course. This is important in order to maintain the water and air impermeability of the membrane thereby protecting the concrete deck therebeneath.

The results for the cold mixes are comparable to those for the hot mixes. Slurry seals have typically been used for short term patching because they are short-lived due mostly to their lack of abrasion resistance and rapid asphalt hardening. The introduction of diatomite in slurry seals can remedy both defects by permitting the addition of more asphalt to extend life and by providing the mix with abrasion resistance. It should be noted that while significant cracks appeared in the slurry seal membranes after formulation in Denver, all signs of cracks had disappeared two hours after placement at Denison. This confirms the ability of this membrane formulation to heal cracks which may form therein. Diatomite-modified slurry seals could have life expectancies exceeding 10-15 years which could make them attractive for many more types of applications than in the past since their placement costs (per yard installed) are about one-fifth that of a hot mix.

As was suggested in the '075 patent application, it is believed that performance of a diatomite-modified paving material will vary as the type and grade of diatomite varies. Characteristics subject to variation include (1) spicular/non-spicular content, (2) gradation of particle sizes, (3) chemical analysis, (4) water content and, (5) quantity of absorptive "pillboxes" in the sample. In order to substantiate these performance differences, a second set of tests were done on another group of pavement sheets. These membrane sheets were placed at an entrance gate of another one of Assignee's plants, this one in Lompoc, Calif. These sheets were prepared using the same asphalt and aggregate as was used in the Denison tests and, as before, the 18"×12"×⅜" sheets (thicknesses varied from ¼" to ½") were placed in, and transverse to, the tire paths of entering the departing truck traffic.

In that CELITE ®292 forms the standard against which the other diatomites will be compared a more complete description appears in TABLE II.

TABLE II

| PROPERTIES OF CELITE ® 292 | |
|---|---|
| Description: | Plankton marine diatomite; natural (uncalcined) grade |
| Wet Density: | 18.0 lb/ft.$^3$ (max.) |
| Moisture: | 6.0% by wt. (max.) |
| Retained on 325 mesh: | 8.0% by wt. (max.) |
| Loose weight: | 10 lb/ft.$^3$ (max.) |
| Oil absorption: | 180-230% by wt. |
| Typical chemical analysis, weight % | |
| Moisture: | 4.0 |
| SiO$_2$: | 85.8 |
| Al$_2$O$_3$: | 3.8 |
| Fe$_2$O$_3$: | 1.2 |

TABLE II-continued

| PROPERTIES OF CELITE ® 292 | |
|---|---|
| CaO: | 0.5 |
| MgO: | 0.6 |
| Na$_2$O: | 0.5 |
| K$_2$O: | 0.4 |
| Other(s) | 0.4 each |

These second set of sheets compared the performance of 292 to a fresh water diatomite from Nevada; freshwater diatomites mined in Alicante, Spain, Jalisoc, Mexico, and Murat, France; several grades of diatomite with finer particle size (SNOW FLOSS® and FILTER-CEL® from Lompoc Crude #4, a low grade ore; and a coarser diatomite (701 cyclone), in sheets containing various amounts of asphalt. In addition, CELITE®292 was added to a softer asphalt (165 penetration) of the type utilized in Canada to determine its effectiveness at controlling stability with an asphalt with less inherent cohesive strength. Further, CELITE®292 was employed in mixes which had the minus 200 mesh fraction of the aggregate reduced from 14% to 7% by sieve separation and, in another instance, with 5% by weight added water.

Figure 2A:
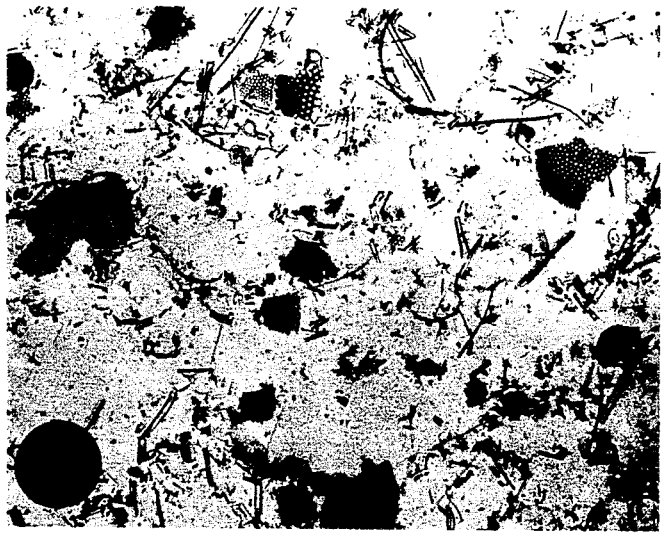
FIG. 2A is a 200x magnification light transmittal photograph of a CELITE ®292 marine diatomite sample.
Figure 2B:
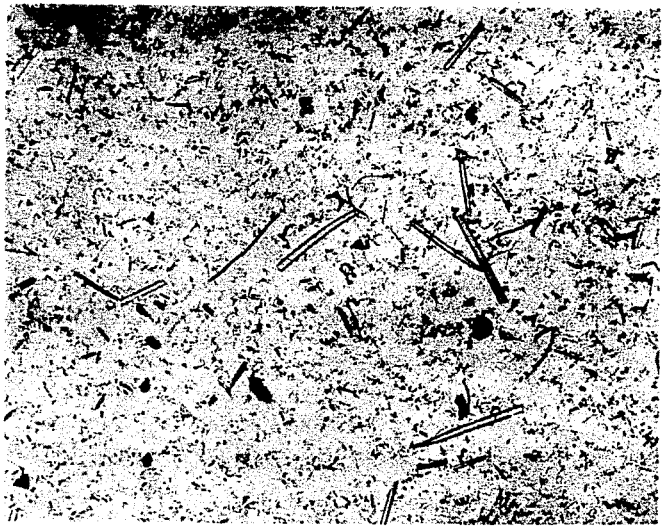
FIG. 2B is a 200x photo of a SNOW FLOSS® marine diatomite sample.
Figure 2C:
FIG. 2C is a 200x photo of a freshwater diatomite sample from Alicante, Spain.
Figure 2D:
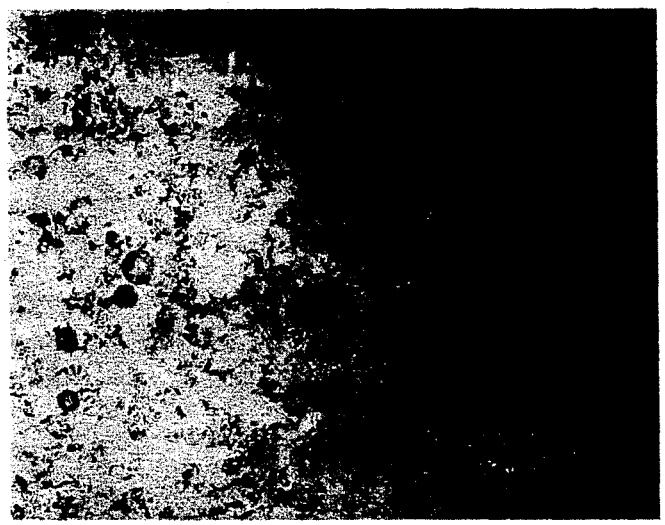
FIG. 2D is a 200x photo of a freshwater diatomite sample from Jalisco, Mexico.
Figure 2E:
FIG. 2E is a 200x photo of a freshwater diatomite sample from Murat, France.
Figure 2F:
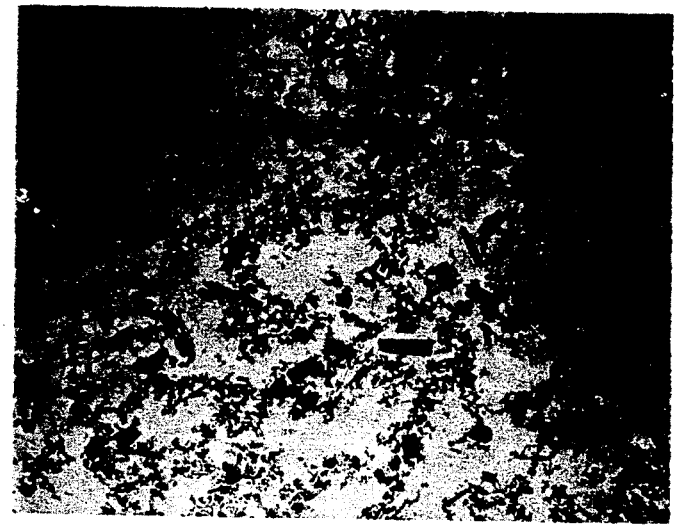
FIG. 2F is a 200x photo of a Nevada freshwater diatomite sample.

FIG. 2A is a 200x magnification of a typical CELITE®292 sample showing the composite nature of this diatomite. CELITE®292 is made up of spicules, "pillboxes" (the most absorptive component) and small particulate. FIGS. 2B-2F show, respectively, photos of samples of SNOW FLOSS® diatomite (2B); diatomite mined in Alicante, Spain (2C), Jalisco, Mexico (2D), Murat, France (2E); and a fresh water diatomite from Nevada (2F).

TABLE III depicts the total plastic flow for each tested sample type (each reading is a two sample average) over a three-month period. In addition, percent flow for the most recent month is presented along side the total value. Initial readings reflect, to a certain extent (perhaps as much as 8%), edge effects (the flattening of the edges of the sheets). Since these edge effects reflect variations in thickness more than they do the mixes' abilities to resist flow, the last month readings should be, at the very least, used to assist in analyzing results.

TABLE III

| Additive | % Wt. | Asphalt | % Sheet Thickness (inches) | Plastic 3 Month | Flow Last month | Comparison to Control Total/Last Month |
|---|---|---|---|---|---|---|
| CEL-292 | 1 | 12.5 | 0.38 | 9.8 | 2.5 | — |
| Control | 2 | 13 | 0.31 | 12.6 | 4.7 | — |
|  | 2 | 14 | 0.31 | 11.7 | 4.4 | — |
| CEL-292 | 1 | 12.5 | 0.31 | 9.2 | 1.4 | Equivalent/44% Less |
| Premixed with | 2 | 13 | 0.44 | 17.1 | 3.3 | 36% More/30% Less |
| 5% water | 2 | 14 | 0.38 | 10.9 | 4.6 | Equivalent/Equivalent |
| Lompoc | 1 | 12.5 | 0.25 | 8.0 | 1.8 | 17% Less/28% Less |
| Crude #4 | 2 | 13 | 0.38 | 22.5 | 8.8 | 79% More/100% More |
| 701 Cyclone | 1 | 12½ | 0.31 | 11.3 | 2.5 | 15% More/Equivalent |
|  | 2 | 13 | 0.31 | 14.3 | 4.3 | 14% More/Equivalent |
|  | 2 | 14 | 0.38 | 11.6 | 2.4 | Equivalent/45% Less |
| SNOW FLOSS ® | 1 | 12.5 | 0.31 | 10.5 | 3.3 | 7% More/32% More |
|  | 2 | 13 | 0.38 | 14.2 | 5.0 | 12% More/Equivalent |
|  | 2 | 14 | 0.34 | 19.5 | 6.0 | 74% More/36% More |
| CEL-292 | 1 | 12.5 | 0.44 | 11.3 | 3.2 | 15% More/28% More |
| Low Fines | 2 | 13 | 0.50 | 12.3 | 4.2 | Equivalent/Equivalent |
| CEL-292 | 1 | 12.5 | 0.38 | 12.2 | 2.1 | 25% More/16% Less |
| Soft Asphalt | 2 | 13 | 0.44 | 18.9 | 4.6 | 50% More/Equivalent |
| Alicante | 1 | 12.5 | 0.31 | 9.4 | 2.5 | Equivalent/Equivalent |
|  | 2 | 13 | 0.31 | 16.3 | 4.6 | 29% More/Equivalent |
|  | 2 | 14 | 0.31 | 14.7 | 4.3 | 26% More/Equivalent |
| Murat | 1 | 12.5 | 0.31 | 7.6 | 2.3 | 22% Less/8% Less |
|  | 2 | 13 | 0.31 | 14.1 | 4.1 | 12% More/13% Less |

TABLE III-continued

| Additive | % Wt. | Asphalt | % Sheet Thickness (inches) | Plastic 3 Month | Flow Last month | Comparison to Control Total/Last Month |
|---|---|---|---|---|---|---|
| | 2 | 14 | 0.31 | 12.0 | 2.1 | Equivalent/52% Less |
| Jalisco | 1 | 12.5 | 0.44 | 13.4 | 2.2 | 37% More/12% Less |
| | 2 | 13 | 0.44 | 18.3 | 6.5 | 45% More/48% More |
| | 2 | 14 | 0.44 | 15.9 | 5.3 | 36% More/20% More |
| Nevada Freshwater | 1 | 12.5 | 0.31 | 11.6 | 3.2 | 18% More/32% More |
| | 2 | 13 | 0.31 | 16.5 | 6.5 | 31% More/38% More |
| | 2 | 14 | 0.31 | 12.2 | 3.6 | Equivalent/18% Less |

In the following analysis of the Table III results, where the latest month's results contradict the total flow (which reflects edge effects), the contradictory result has been used to soften or mitigate the conclusion which might otherwise be drawn.

CELITE ®292 premixed with 5% additional water by weight appears to perform as well as or better than CELITE ®292 directly from the bag. Unfortunately, this limited data does not permit a conclusion to be drawn regarding where excess moisture in either the diatomite or the aggregate will cease to be advantageous and become a detriment. There is no question that the water added to any asphalt mix need be carefully monitored and controlled in order to be able to predict performance for a given mix design. This means that aggregate stored in the open air should be heated for longer than normal periods of time in order to drive off any excess moisture prior to the addition of the asphalt and diatomite.

Results from the lower grade Lompoc Crude #4 indicate that while this diatomite may be as good or better at controlling plastic flow in small amounts, larger amounts are significantly less effective. It should be noted here that in changing from the 1%/12.5% mix to the 2%/13%, there is a 100% increase in filler content with only a 4% increase in asphalt. If a filler will have a tendency to make a mix water susceptible, it will be most pronounced in such circumstances. The significant difference in performance in the two mixes containing Crude #4 diatomite seems best explained as the introduction of a water susceptibility problem. Water susceptibility is controlled by reducing the filler/asphalt ratio of the suspected problem creator (i.e., reduce the amount of filler or increase the amount of asphalt to more fully coat the filler). One ingredient of a diatomite sample which will tend to introduce a water susceptibility problem is the presence of non-particulate silica (clay, etc.).

Other sheets which seem to manifest a water susceptibility problem are the Jalisco and Nevada fresh water containing sheets. Increasing asphalt content from 13 to 14% decreases the problem somewhat. However, both of these samples appear to be significantly less effective at controlling flow than CELITE ®292. This does not rule out the use of these types of diatomite in membrane and other asphalt mixes. It may be possible to increase the amount added of these diatomites by some proportionate amount in order to achieve an adequate control of flow. Additional testing is necessary to determine if, and in what amounts, increased levels of these fillers will counter the deficiency of the particular diatomite.

Evaluation of the results from the 701 cyclone and SNOW FLOSS ® sheets are consistent with known data relating to, and explainable on the basis of, their respective particle sizes. If a filler particule is on the order of magnitude of the thickness of the mastic coating or smaller (in this case, filled asphalt), it will tend to volumetrically extend the mastic. If the filler particle is larger than the thickness of the mastic, it will function as a piece of aggregate requiring additional amounts of mastic to coat it. The 701 cyclone diatomite has roughly 50% of its particulate weight concentrated in sizes larger than the largest CELITE ®292 or SNOW FLOSS ® particle. Accordingly, in the high asphalt, high filler mix (2%/14%), where there could presumably be excess asphalt, the 701 cyclone diatomite is most effective at controlling flow. Similarly, it is this same 2%/14% mix in which the SNOW FLOSS ®, which is slightly finer than CELITE ®292, is least effective.

As mentioned in the '075 application, there are two principal forces at work in an asphalt pavement. The first is adhesion/cohesion. Generally, it is the properties of the asphalt itself which determine the magnitude of the adhesive/cohesive force within the mastic. However, diatomite can enhance or optimize this force for a particular asphalt pavement mix design. Since the adhesive/cohesive strength of a mastic is inversely proportional to its thickness, diatomite can optimize this force by adsorbing (absorbing and holding) any excess asphalt to keep the thickness of the mastic coating at its optimum minimum. This adsorption typically takes place in a hot mix, once the pavement cools below 200° F. In this way, the added asphalt facilitates compaction, reduces voids to reduce oxidation hardening but, is not allowed to move freely within the pavement, thereby preventing instability in the form of bleeding, rutting and shoving.

The second force at work within an asphalt pavement is aggregate interlock. In a mix having properly size gradation, the components of aggregate fit together like pieces in a jigsaw puzzle and create an interparticle friction known as aggregate interlock. Diatomite, with its diversity of particle sizes and shapes, can enhance aggregate interlock within the mastic film by filling gaps between the aggregate fines.

The higher plastic flow in the 1%/12.5% mix for the low fines aggregate indicates the adverse effect low fines has on aggregate interlock (i.e., aggregate particulate friction). The ability of the 2%/13% mix to make up for the deficient fines substantiates earlier findings which suggested diatomite could successfully be substituted for missing fines.

The success with which CELITE ®292 was able to stabilize plastic flow of the softer (165 pen.) asphalt suggests that diatomite modification of pavement mixes may enable these softer, less expensive asphalts to be used in the U.S. At present, Canada uses these softer asphalts but none are used in the United States. In all probability, these less stable pavements would be limited to less heavily traveled roads (residential) or for membrane applications and not as surface courses on highways or interstages. However, the mere fact that the addition of diatomite can makeup for the lack of cohesive force in the thinner asphalt mastic, says a great deal about its capabilities as a functional filler.

The diatomite samples from Alicante, Spain and Murat, France, have been shown to be equivalent and superior, respectively, to CELITE®292 in stabilizing plastic flow in these membrane mixes. These limited tests have not unlocked the mystery as to which features of diatomite make one sample more effective than another at controlling plastic flow of a given mix. Certainly, the five which were earlier enumerated (spicular/non-spicular, gradation, chemistry, water content and absorptivity) are among those variables producing differences in performance. Further, it is believed that gradation of particle size is among the most important variables. However, not all the differences in the Table III results can be explained on the basis of particle size alone. Accordingly, the other features must play a significant role, as well.

Cold mixes or "slurry seals" have become increasingly popular as a temporary "quick-fix" crack filling, surface treatment for an aging asphalt concrete. Slurry seals are of three types. Type I as defined by ASTM is the most popular and contains from 10 to 16% by weight of the dry aggregate residual asphalt (or 9 to 14% weight of the total mix). For a typical asphalt emulsion containing 63.5% asphalt by weight, the mix would contain between 15.7 and 25.2% emulsion. Type I slurry seal is used as a crack filler and pavement rejuvenator. (Much of its "rejuvenation" capability is in improving cosmetic appearance rather than improving functional performance.) Although a slurry seal mix is comparatively inexpensive to use costing one-fifth as much as an asphalt concrete wearing course, it has an average life expectancy between 3 and 5 years.

The life expectancy shortcoming of slurry seals seems to stem from two deficiencies: lack of abrasion resistance and poor tensile strengths. This overall lack of strength is due in large part to the manner in which it is poured onto the surface and cannot be densified or compacted as are hot mixes. Further, most slurry seals are unable to benefit from the traffic compaction which would occur with a higher asphalt content since even a 1% by weight of the mix increase in residual asphalt greatly weakens initial strength of the slurry seal. The poor cohesive strength of the standard slurry seals leads to debonding and/or wearing away in a relatively short period of time. Experience using diatomite in asphalt concrete pavements suggested that its addition to slurry seal mixes might remedy these deficiencies through the combined benefit of higher asphalt content and improved cohesive strength. Accordingly, initial testing was performed to determine if, in fact, diatomite addition to slurry seal mixes would be beneficial, if so, in what amounts, how much additional water would be necessary, and how best to add the water and the diatomite to the slurry seal mix. Additional water is necessary since diatomite is capable of absorbing 3½ times its owns weight of water. Should extra water not be added, diatomite would preferentially absorb the water in the asphalt emulsion causing the emulsion to "break" prematurely and act like solid rather than a liquid, in turn, making the slurry seal too stiff to flow.

Three test slurry samples were made using three different methods of adding the diatomite (CELITE®292) and water:

(1) diatomite was premixed with 2½ times its weight of water then added to the aggregate which was pre-wet with 4% of its weight of water. The asphalt emulsion (63.5% asphalt, 36.5% water) was added last. As anticipated, the wet diatomite dispersed poorly;

(2) all extra water (same as above was used to pre-wet the aggregate and then the asphalt emulsion was added. Dry diatomite was added last in accordance with hot mix procedures;

(3) all extra water was used to pre-wet the aggregate; then the diatomite was added and mixed. Last, the asphalt emulsion was added.

The results of these three mixing techniques are shown in the first portion of Table IV. As a result of these preliminary tests, the third mixing procedure (adding dry diatomite to pre-wet aggregate, then emulsion) was determined to give the best mix from both a processability standpoint and a physical properties standpoint. Apparently, pre-wetting the aggregate in a cold mix has a similar effect as pre-coating the aggregate with asphalt in the hot mix: the water acts as a lubricant such that the diatoms are not crushed as a result of high shear forces in the mixer. All subsequent mixes for these laboratory tests (TABLE IV) employed this third mixing procedure.

TABLE IV

| Sample # | Diatomite* Content % | Emulsion Content % | Diatomite/ Asphalt Ratio | Extra Water | Dry Density gm/cc | Puncture Test 1400° F Ultimate Load, lb. | Drying Shrinkage |
|---|---|---|---|---|---|---|---|
| 1 | 2.5 | 27 | 0.14 | 10 | 1.51 | 3 | Excessive |
| 2 | 2.5 | 27 | 0.14 | 10 | 1.36 | 2.5 | Moderate |
| 3 | 2.5 | 27 | 0.14 | 10 | 1.60 | 6 | N.D.** |
| 4 | 0 | 18 | — | 4 | 1.52 | 1.5 | Slight |
| 5 | 1 | 18 | .09 | 10 | 1.45 | 0.5 | Slight |
| 6 | 1 | 20 | .08 | 7.5 | 1.56 | 4.5 | Moderate |
| 7 | 1.5 | 24 | .10 | 12.5 | 1.44 | 9 | N.D.** |
| 8 | 2 | 27 | .12 | 10 | 1.66 | 1 | Excessive |

*CELITE ® 292
**Not determined. Shrinkage was evaluated on the basis of separation from the edges of the mold following removal from the drying oven. The molds for these samples were removed prior to completion of the drying procedure for use in making other samples.

Comparison of Samples 4 and 5 indicates the addition of diatomite in and of itself will not produce a benefit in strength. Some increase in emulsion content (Sample 6) is necessary in order to achieve the desired result. The Sample 8 puncture test result is an anomaly. While it is not fully understood why Sample 8 produced such a weak sample as compared to Samples 1-3, it is believed the excessive shrinkage may hold the key. This high level of shrinkage could have produced stress cracking resulting in this low strength reading.

While the primary reasons for adding diatomite to a slurry seal mix are to improve adhesive/cohesive strength and abrasion resistance, such a mix could not be used if it was unstable (i.e., manifested excessive plastic flow). Further, recent results have shown a decided lack of correlation between lab test results and field trials. For these reasons and, in addition, to confirm the possibility of manufacturing a cold mix membrane, sample slurry seal sheets were produced for the Denison trial (see above). In order to confirm previous results under varying conditions, diatomite-modified slurry seal mixes were prepared on location at Lompoc in conjunction with the sheet placements set forth above in Table III. The Lompoc slurry seal mixes and the Denison slurry seal membranes used the mixing procedure adapted in the lab tests. The formulations and results of these stability tests appear in Table V hereafter.

TABLE V

| Sample | Formulation % wt of Mix | | | Aggregate | **Thickness (Est. in inches) | % Change in Length | |
|---|---|---|---|---|---|---|---|
| | Diatomite* | Asphalt | Ratio | | | 3 months | Last Month |
| A | 0 | 11.8 | — | H.F. | .5 | 8.7 | 5.1 |
| B | 1.55 | 7.8 | 0.2 | H.F. | .5 | 1.8 | 0.8 |
| C | 0.93 | 11.7 | 0.08 | H.F. | .5 | 7.7 | 2.9 |
| D | 0.93 | 11.7 | 0.08 | L.F. | .5 | 5.4 | 2.4 |
| E | 1.8 | 14.0 | 0.13 | H.F. | .5 | 9.4 | 1.8 |
| F | 0.94 | 10.1 | 0.09 | L.F. | .375 | 3.3 | 0.7 |
| G | 0 | 10.2 | — | L.F. | .375 | 2.6 | 0.7 |

*All diatomite was CELITE ® 292.
**Indicates % fines content. As was done with one Table III membrane, for some samples, ½ of the minus 200 mesh fraction was removed. These low fines (L.F.) samples had 7% −200 m. fraction while the high fines (H.F.) samples had 14% (by wt. of aggregate −200 m.

The Lompoc results confirm that diatomite can be added to slurry seal mixes to improve abrasion resistance, increase tensile and cohesive strengths, and permit an increase in the asphalt content of the mix without detrimentally affecting stability. Diatomite modification eliminates the principal drawbacks of slurry seals increasing potential wear life to as much as 10–15 years. Coupled with slurry seals' significant advantages of much lower cost and substantially less energy required to install, diatomite-modified slurry seals may enable highway departments to bring under control both their ever crumbling roadways and their skyrocketing repair costs.

As a result of the present invention, any cement pavement or bridge deck can be protected by an impermeable, crack-resistant diatomite-modified membrane. Any water or moisture-carried corrosive (such as commercially available de-icing salts) will penetrate the more porous wearing course, which is necessarily permeable to avoid skidding and hydroplaning problems. However, the impermeable membrane of the prsent invention will prevent their penetrating to, and destructive activity upon, the concrete roadway beneath. The corrosives will run laterally out from between the wearing course and the membrane without reaching or attacking the concrete underlayment. Such a membrane can take the form of a conventional hot mix membrane or can be a cold mix (slurry seal) membrane. In either case, the membrane is capable of withstanding temporary traffic until a wearing course can be placed thereover. Such placement will reactivate the asphalt and enable the membrane to be compacted to impermeability.

These membranes have other potential uses, as well. If an aging asphalt pavement could satisfactorily serve as an underlayment, a membrane of the present invention could be placed thereover to protect the pavement beneath from additional oxidation hardening (leading to crumbling) and from the effects of water and freeze/thaw cycling. Another usage of such a membrane, whether pre-formed in sheets or layed in place by conventional paving machines, would be as a surface mastic into which surface, course stone chips could be rolled to form a suitable wearing course. The asbestos membrane of the previously noted patent was successfully employed for such usage by the Illinois Department of Transportation.

The present invention also contemplates a general use slurry seal as well. Diatomite-modification cures both major defects of slurry seal by improving both tensile and cohesive strength and abrasion resistance. In addition, diatomite-modification permits modest increases in asphalt content without creating instability problems which will have the following additional benefits: (1) improved crack-resistance (i.e., a self-healing capability) for applications where needed; (2) lower voids for reduced permeability and reduced oxidation hardening and water degradation; and (3) higher initial asphalt levels for longer wear life.

Last, the data has shown considerable variability of results for various diatomite types and grades. While testing done in conjunction with this and its two parent applications have substantiated the benefits of using one particular grade of diatomite (CELITE ®292) in a variety of paving applications, care should be taken to quantify performance data when substituting any other type or grade of diatomite. Otherwise, a bad experience in the field may lead the mix designer to the potentially erroneous general conclusion that diatomite, of whatever type and grade, is inappropriate for a particular usage.

Various changes, modifications and alternatives will become apparent as a result of reading the foregoing specification. It is intended that all such changes, modifications and alternatives as come within the scope of the following claims be considered part of the present invention.

I claim:

1. An improved aqueous cold mix slurry seal made from fine aggregate, a filler and an asphalt emulsion, said slurry seal pavement comprising in the range of 9 to 14% by weight of the mix is residual asphalt, in the range of 0.5 to 3.0% by weight diatomite filler and in the range of 90.5 to 83% by weight fine aggregate of which 70 to 100% passes no. 8 (No. 10) mesh sieve, said mix having a diatomite/asphalt ratio in the range of 0.08 to 0.30.

2. The slurry seal pavement of claim 1 wherein the diatomite/asphalt ratio is in the range of 0.25 to 0.29.

3. A membrane made from the slurry seal pavement of claim 1.

4. The membrane of claim 3 wherein cracks forming in said membrane are self-healing under normal traffic pressures exerted through the overlying wearing course.

5. A process for preparing a diatomite modified slurry seal mix including an asphalt emulsion, diatomite filler and a fine aggregate; the addition of the diatomite requiring extra water in addition to that contained in said emulsion of an amount at least equal to between 2 and 4 times the weight of diatomite added to the mix, the steps comprising
 (a) mixing at least most of the added water with the aggregate;
 (b) adding the diatomite to the pre-wet aggregate and mixing it therewith;
 (c) adding asphalt emulsion to the aggregate/filler mix and mixing said asphalt therewith until complete coating of the aggregate/filler is achieved.

6. The process of claim 5 wherein all of the extra water is used to pre-wet the aggregate.